US012337467B2

(12) United States Patent
Marx et al.

(10) Patent No.: US 12,337,467 B2
(45) Date of Patent: Jun. 24, 2025

(54) WAFER-HANDLING END EFFECTORS CONFIGURED TO SELECTIVELY LIFT A WAFER FROM AN UPPER SURFACE OF THE WAFER, PROBE SYSTEMS THAT INCLUDE THE WAFER-HANDLING END EFFECTORS, AND METHODS OF UTILIZING THE WAFER-HANDLING END EFFECTORS

(71) Applicant: FormFactor, Inc., Livermore, CA (US)

(72) Inventors: Benedikt Marx, Dresden (DE); Axel Becker, Dresden (DE)

(73) Assignee: FormFactor, Inc., Livermore, CA (US)

( * ) Notice: Subject to any disclaimer, the term of this patent is extended or adjusted under 35 U.S.C. 154(b) by 0 days.

(21) Appl. No.: 18/506,935

(22) Filed: Nov. 10, 2023

(65) Prior Publication Data
US 2024/0190019 A1    Jun. 13, 2024

Related U.S. Application Data

(60) Provisional application No. 63/431,433, filed on Dec. 9, 2022.

(51) Int. Cl.
*B25J 15/06* (2006.01)
*B25J 11/00* (2006.01)

(52) U.S. Cl.
CPC ....... *B25J 15/0616* (2013.01); *B25J 11/0095* (2013.01)

(58) Field of Classification Search
CPC .............................. B25J 15/0616; B25J 11/0095
See application file for complete search history.

(56) References Cited

U.S. PATENT DOCUMENTS 3,154,306 A   10/1964   Elliott et al.
3,230,002 A   1/1966    Olson
(Continued)

FOREIGN PATENT DOCUMENTS

JP   H08107136 A    4/1996
JP   2002346965 A   12/2002
(Continued)

OTHER PUBLICATIONS

English-language translation of Japanese Patent Publication JPH08107136 A, Apr. 23, 1996.
(Continued)

*Primary Examiner* — Stephen A Vu
(74) *Attorney, Agent, or Firm* — KOLITCH ROMANO DASCENZO GATES LLC

(57) ABSTRACT

Wafer-handling end effectors, probe systems that include wafer-handling end effectors, and methods of utilizing wafer-handling end effectors are disclosed herein. The wafer-handling end effectors are configured to selectively lift a wafer from an upper surface thereof and include a blade, a surface extension, and an attachment mechanism. The blade defines a wafer-facing blade side and includes a gas distribution manifold in fluid communication with the wafer-facing blade side. The surface extension defines a wafer-facing extension side that extends away from the blade. The surface extension extends at least partially around the wafer-facing blade side and includes at least three projecting regions that project from the wafer-facing extension side and are configured to physically contact the upper surface of the wafer. The attachment mechanism is configured to permit selective attachment of the surface extension to the blade and selective separation of the surface extension from the blade.

21 Claims, 7 Drawing Sheets

(56) References Cited

U.S. PATENT DOCUMENTS

| | | |
|---|---|---|
| 4,600,229 A | 7/1986 | Oten |
| 4,708,381 A | 11/1987 | Lundback |
| 4,789,294 A | 12/1988 | Sato et al. |
| 4,852,926 A | 8/1989 | Littell |
| 5,013,075 A | 5/1991 | Littell |
| 5,226,636 A | 7/1993 | Nenadic et al. |
| 5,278,494 A | 1/1994 | Obigane |
| 5,672,239 A | 9/1997 | DeOrnellas |
| 5,690,467 A | 11/1997 | Smith |
| 5,801,527 A | 9/1998 | Ishii et al. |
| 6,202,318 B1 | 3/2001 | Guidi et al. |
| 6,254,155 B1 | 7/2001 | Kassir |
| 6,256,555 B1 | 7/2001 | Bacchi et al. |
| 6,279,976 B1 | 8/2001 | Ball |
| 6,409,453 B1 | 6/2002 | Brodine et al. |
| 6,499,777 B1 | 12/2002 | Wang |
| 6,690,986 B1 | 2/2004 | Mitchell et al. |
| 6,942,265 B1 | 9/2005 | Boyd et al. |
| 7,196,507 B2 | 3/2007 | Schneidewind et al. |
| 7,293,811 B2 | 11/2007 | Bonora et al. |
| 8,281,674 B2 | 10/2012 | Nisany et al. |
| 8,556,315 B2 * | 10/2013 | Kampe ............... H01L 21/6838 294/64.2 |
| 9,108,320 B2 * | 8/2015 | Furuichi ............... B25J 15/0616 |
| 9,460,953 B2 | 10/2016 | Sato et al. |
| 10,259,124 B2 * | 4/2019 | Bogner ................ B25J 15/0683 |
| 11,276,595 B2 * | 3/2022 | Miyamoto ............. H01L 21/68 |
| 2003/0006010 A1 | 1/2003 | Holzbecher et al. |
| 2005/0012515 A1 | 1/2005 | Kim |
| 2006/0066293 A1 | 3/2006 | Gopal et al. |
| 2007/0045536 A1 | 3/2007 | Nakasuji et al. |
| 2009/0212803 A1 | 8/2009 | Yamamoto et al. |
| 2010/0011569 A1 | 1/2010 | Dietrich et al. |
| 2012/0235335 A1 | 9/2012 | Hayashi et al. |
| 2013/0180409 A1 | 7/2013 | Dogan et al. |
| 2014/0186145 A1 | 7/2014 | Fehrmann et al. |
| 2015/0255322 A1 | 9/2015 | Ingram-Goble et al. |

FOREIGN PATENT DOCUMENTS

| | | |
|---|---|---|
| JP | 2009-158902 A | 7/2009 |
| TW | 200908195 | 2/2009 |
| TW | 201034108 | 9/2010 |

OTHER PUBLICATIONS

English-language translation of Japanese Patent Publication JP2002346965A, Dec. 4, 2002.

English-language abstract of Taiwan Patent Application No. TW200908195, Feb. 16, 2009.

English-language translation of Japanese Patent Publication 2009-158902 A, Jul. 16, 2009.

English-language abstract of Taiwan Patent Application No. TW201034108, Sep. 16, 2010.

PowerPoint Presentation by Owens Design entitled End Effector Selection and Design, accessed Feb. 20, 2014.

Polyimide; Wikipedia, page last edited Sep. 8, 2017, retrieved Oct. 26, 2017 from URL: https://en.wikipedia.org/wiki/Polyimide (Year 2017).

Semiconductor Lithography (Photolithography)—The Basic Process; Lithoguru.com, date unavailable, retrieved Oct. 26, 2017 from URL: http://www.lithoguru.com/scientist/lithobasics.html (Year 2017).

Silicone rubber; Wikipedia, page last edited Aug. 25, 2017, retrieved Oct. 26, 2017 from URL: https://en.wikipedia.org/wiki/Silicone_rubber (Year 2017).

* cited by examiner

WAFER-HANDLING END EFFECTORS CONFIGURED TO SELECTIVELY LIFT A WAFER FROM AN UPPER SURFACE OF THE WAFER, PROBE SYSTEMS THAT INCLUDE THE WAFER-HANDLING END EFFECTORS, AND METHODS OF UTILIZING THE WAFER-HANDLING END EFFECTORS

RELATED APPLICATION

This application claims priority to U.S. Provisional Patent Application No. 63/431,433, which was filed on Dec. 9, 2022, and the complete disclosure of which is hereby incorporated by reference.

FIELD OF THE DISCLOSURE

The present disclosure relates generally to wafer-handling end effectors configured to selectively lift a wafer from an upper surface of the wafer, to probe systems that include the wafer-handling end effectors, and/or to methods of utilizing the wafer-handling end effectors.

BACKGROUND OF THE DISCLOSURE

Wafer-handling end effectors that are configured to selectively lift a wafer from an upper surface of the wafer may be utilized by wafer-handling robots to grip, to grab, to lift, and/or to otherwise convey wafers to, from, and/or within semiconductor manufacture, sort, and/or test equipment. Some conventional wafer-handling end effectors, which are configured to selectively lift the wafer from the upper surface, are configured to contact wafers within an edge exclusion zone thereof and only may be configured to convey wafers of a specific size, or diameter, such as 100 millimeter (mm) diameter wafers, 200 mm diameter wafers, and/or 300 mm diameter wafers.

Other conventional wafer-handling end effectors, which also are configured to selectively lift the wafer from the upper surface, are configured to contact a central region of the wafer that includes integrated circuit devices. Such wafer-handling end effectors may be effective at selectively lifting wafers of a variety of different sizes, or diameters; however, these wafer-handling end effectors only may be utilized with certain wafers, under certain conditions, and/or at certain steps during the manufacture of the integrated circuit devices. As an example, such wafer-handling end effectors contact, and thus may cause damage to, the integrated circuit devices.

In some environments, it may be desirable for a given wafer-handling robot to convey wafers of different sizes by selectively lifting the wafers from the upper surface and/or without contacting any integrated circuit devices formed on the wafers. However, a single conventional wafer-handling end effector generally cannot be utilized for multiple wafer sizes.

As such, converting the given wafer-handling robot from conveying one wafer size to conveying a different wafer size generally requires that a wafer-handling end effector for the one wafer size must be replaced with a wafer-handling end effector for the different wafer size. This is a time-consuming process that requires removal of the wafer-handling end effector for the one wafer size from the wafer-handling robot, attachment of the wafer-handling end effector for the different wafer size to the wafer-handling robot, and subsequent teaching of the wafer-handling robot to operate precisely with the end effector for the different wafer size. Thus, there exists a need for improved wafer-handling end effectors, for probe systems that include the improved wafer-handling end effectors, and/or for improved methods of utilizing wafer-handling end effectors.

SUMMARY OF THE DISCLOSURE

Wafer-handling end effectors, probe systems that include wafer-handling end effectors, and methods of utilizing wafer-handling end effectors are disclosed herein. The wafer-handling end effectors are configured to selectively lift a wafer from an upper surface thereof, via a pressure force, and include a blade, a surface extension, and an attachment mechanism. The blade defines a wafer-facing blade side and includes a gas distribution manifold in fluid communication with the wafer-facing blade side. The surface extension defines a wafer-facing extension side that extends away from the blade. The surface extension extends at least partially around the wafer-facing blade side and includes at least three projecting regions that project from the wafer-facing extension side. The at least three projecting regions are configured to physically contact the upper surface of the wafer when the end effector selectively lifts the wafer. The attachment mechanism is configured to permit selective attachment of the surface extension to the blade and selective separation of the surface extension from the blade.

The probe systems are configured to test a wafer that includes an integrated circuit device and include a chuck, a signal generation and analysis assembly, a probe assembly, a wafer-handling robot, and a pressurized gas source. The chuck defines a support surface configured to support the wafer, and the signal generation and analysis assembly is configured to generate a test signal and to receive a resultant signal. The probe assembly is configured to receive the test signal from the signal generation and analysis assembly and provide the test signal to the integrated circuit device and/or to receive the resultant signal from the integrated circuit device and provide the resultant signal to the signal generation and analysis assembly. The wafer-handling robot is configured to position the wafer within the probe system, and the pressurized gas source is configured to selectively provide a pressurized gas stream to the gas distribution manifold to generate the pressure force that selectively lifts the wafer.

The methods include separating, from a blade of the wafer-handling end effector, a first surface extension that defines a first wafer-facing extension side with a first wafer-facing extension surface area. The methods also include attaching, to the blade of the wafer-handling end effector, a second surface extension that defines a second wafer-facing extension side with a second wafer-facing extension surface area that differs from the first wafer-facing extension surface area.

DETAILED DESCRIPTION AND BEST MODE OF THE DISCLOSURE

Figure 1:
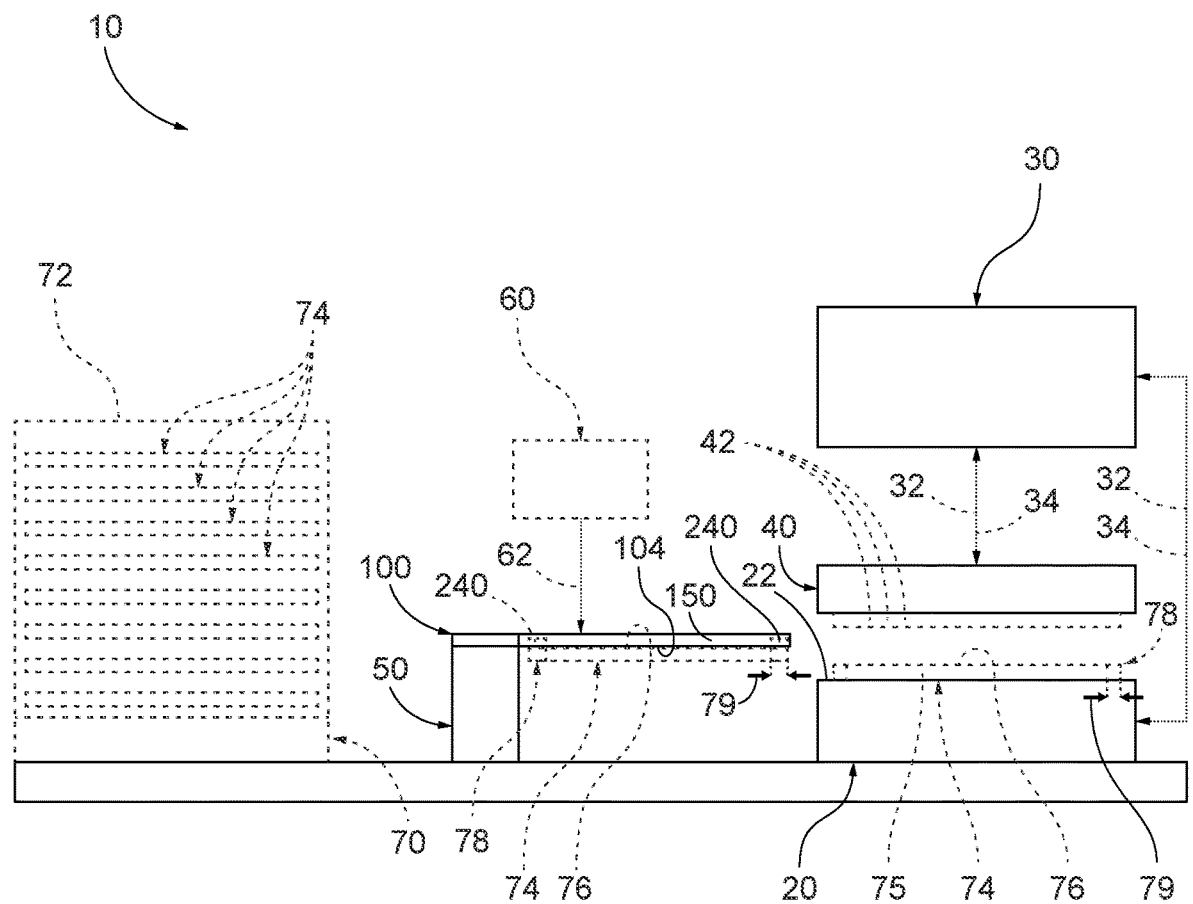
FIG. 1 is a schematic illustration of examples of probe systems that include wafer-handling end effectors, according to the present disclosure.

FIGS. 1-7 provide examples of probe systems 10, wafer-handling end effectors 100, and/or methods 300, according to the present disclosure. Elements that serve a similar, or at least substantially similar, purpose are labeled with like numbers in each of FIGS. 1-7, and these elements may not be discussed in detail herein with reference to each of FIGS. 1-7. Similarly, all elements may not be labeled in each of FIGS. 1-7, but reference numerals associated therewith may be utilized herein for consistency. Elements, components, and/or features that are discussed herein with reference to one or more of FIGS. 1-7 may be included in and/or utilized with any of FIGS. 1-7 without departing from the scope of the present disclosure.

In general, elements that are likely to be included in a particular embodiment are illustrated in solid lines, while elements that are optional may be illustrated in dashed lines. However, elements that are shown in solid lines may not be essential to all embodiments and, in some embodiments, may be omitted without departing from the scope of the present disclosure.

FIG. 1 is a schematic illustration of examples of probe systems 10 that include wafer-handling end effectors 100, according to the present disclosure. As illustrated in solid lines in FIG. 1, probe systems 10 include a chuck 20, a signal generation and analysis assembly 30, a probe assembly 40, and a wafer-handling robot 50.

Chuck 20 may define a support surface 22 configured to support a wafer 74. Examples of chuck 20 include a shielded chuck, an electrically shielded chuck, a vacuum chuck, and/or a temperature-controlled chuck. Examples of wafer 74 include a semiconductor wafer, a silicon wafer, a type III-V semiconductor wafer, and/or any suitable substrate upon which an integrated circuit device 75 may be formed and/or defined.

Signal generation and analysis assembly 30 may be configured to generate a test signal 32 and/or to receive a resultant signal 34. Examples of signal generation and analysis assembly 30 include a test signal generator, a function generator, an electrical signal generator, an optical signal generator, a resultant signal receiver, a resultant signal analyzer, an electrical signal detector, an electrical signal analyzer, an optical detector, and/or an optical signal analyzer.

Probe assembly 40 may be configured to receive test signal 32 from signal generation and analysis assembly 30 and to provide the test signal to integrated circuit device 75 of wafer 74. Additionally or alternatively, probe assembly 40 may be configured to receive resultant signal 34 from integrated circuit device 75 and to provide the resultant signal to the signal generation and analysis assembly. Integrated circuit device 75 may produce and/or generate the resultant signal at least partially responsive to receipt of the test signal.

In some examples of probe systems 10, probe assembly 40 may receive both test signal 32 and resultant signal 34. In other examples of probe systems 10, probe assembly 40 may receive one of test signal 32 and resultant signal 34, while the other of test signal 32 and resultant signal 34 may be conveyed to signal generation and analysis assembly 30 via another structure, such as chuck 20. Probe assembly 40 may include one or more probes 42, examples of which include an electrical probe, a contact probe, an electromagnetic probe, an optical probe, and/or a non-contact probe.

Wafer-handling robot 50 may be configured to position wafer 74 within probe system 10 and includes wafer-handling end effector 100. Examples of wafer-handling robot 50 include a robotic arm, a motor, a servo motor, a stepper motor, and/or a motor controller. Examples of wafer-handling end effector 100, which also may be referred to herein as an end effector 100, are discussed in more detail herein.

As illustrated in dashed lines in FIG. 1, probe systems 10 may include a wafer cassette docking port 70. Wafer cassette docking port 70 may be configured to receive a wafer cassette 72, which may include, contain, and/or house a plurality of wafers 74. Examples of wafer cassette docking port 70 include any suitable port, surface, actuator, and/or receptacle that may be shaped, sized, and/or designed to receive, to detect the presence of, and/or to support wafer cassette 72. Examples of wafer cassette 72 include a suitable container and/or housing that is sized and/or configured to enclose and/or contain wafers 74.

As also illustrated in dashed lines in FIG. 1, probe systems 10 may include a pressurized gas source 60. Pressurized gas source 60 may be configured to provide, or to selectively provide, a pressurized gas stream 62 to end effector 100, such as to a gas distribution manifold 150 of the end effector, to generate a pressure force that may be utilized to selectively lift wafer 74 utilizing the end effector. Examples of pressurized gas source 60 include a pressurized gas tank, a compressor, and/or a blower. Examples of pressurized gas stream 62 include an air stream, a dry air stream, and/or an inert gas stream.

As illustrated in FIG. 1, support surface 22 of chuck 20 generally faces upward and supports wafer 74 such that an upper surface 76 of the wafer also faces upward. With this in mind, and as discussed in more detail herein, a wafer-facing end effector side 104 of end effector 100 generally faces downward, faces toward support surface 22, and/or faces toward upper surface 76 of wafer 74, at least when the end effector selectively lifts the wafer.

During operation of probe systems 10, wafer-handling robot 50 may be configured to retrieve a wafer 74 from wafer cassette 72 and to place the wafer on support surface 22 of chuck 20. This may include positioning end effector 100 above wafer 74 within wafer cassette 72 and providing pressurized gas stream 62 to gas distribution manifold 150 to generate the pressure force, which may permit the end effector to selectively lift and/or attach to the wafer and thereby couple the wafer to the end effector for movement with the end effector, as described herein. While the pressurized gas stream is being provided to the gas distribution manifold, wafer-handling robot 50 may convey the wafer to a position above support surface 22 and thereafter the flow of the pressurized gas stream may be ceased, thereby releasing the wafer from the end effector. Probe system 10 then may test the operation of one or more integrated circuit devices 75 of wafer 74, such as via providing test signal 32 to the integrated circuit devices and/or receiving resultant signal 34 from the integrated circuit devices. Subsequent to testing of the one or more integrated circuit devices, wafer-handling robot 50 may transfer wafer 74 from support surface 22 of chuck 20 to wafer cassette 72. This process may be repeated any suitable number of times to test the operation of any suitable number of wafers from wafer cassette 72. With the above in mind, end effector 100 may be sized and/or shaped for clearance within wafer cassette 72, such as between two adjacent wafers positioned within the wafer cassette.

Wafer-handling end effector 100 may be configured to generate the pressure force and/or to lift wafer 74 via flow of pressurized gas stream 62 between the wafer-handling end effector and the wafer, thereby generating a low-pressure region between the end effector and the wafer. This phenomenon may be described by the Bernoulli Effect and/or by the Cyclone Effect. As discussed, it may be desirable to utilize probe systems 10 with a variety of different sizes, or diameters, of wafers 74. However, and as also discussed, conventional wafer-handling end effectors, which are configured to lift the wafer from the upper surface of the wafer, may be incapable of reliably lifting multiple wafer sizes in the manner that is discussed herein with reference to FIG. 1.

With the above in mind, FIGS. 2-6 illustrate examples of wafer-handling end effectors 100 that may be utilized with probe systems 10, according to the present disclosure. Wafer-handling end effectors 100 of FIGS. 2-6 may include and/or be more detailed illustrations of wafer-handling end effector 100 that is illustrated in FIG. 1. With this in mind, any of the structures, functions, and/or features that are disclosed herein with reference to wafer-handling end effectors 100 of FIGS. 2-6 may be included in and/or utilized with wafer-handling end effectors 100 and/or probe systems 10 of FIG. 1 without departing from the scope of the present disclosure. Similarly, any of the structures, functions and/or features that are disclosed herein with reference to wafer-handling end effectors 100 and/or probe systems 10 of FIG. 1 may be included in and/or utilized with wafer-handling end effectors 100 of FIGS. 2-6 without departing from the scope of the present disclosure.

Figure 4:
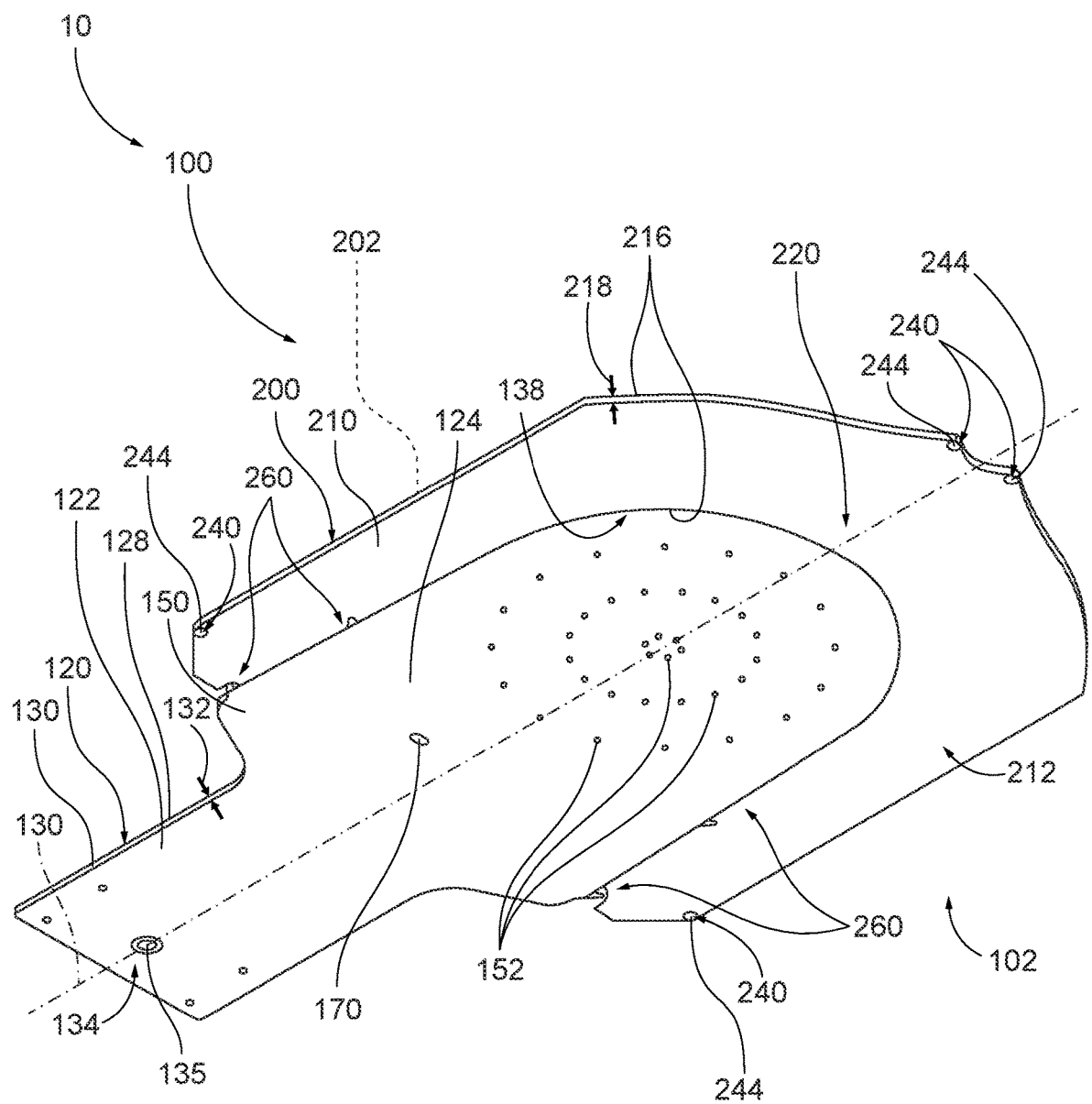
FIG. 4 is a less schematic profile view illustrating an example of a wafer-handling end effector according to the present disclosure.
Figure 5:
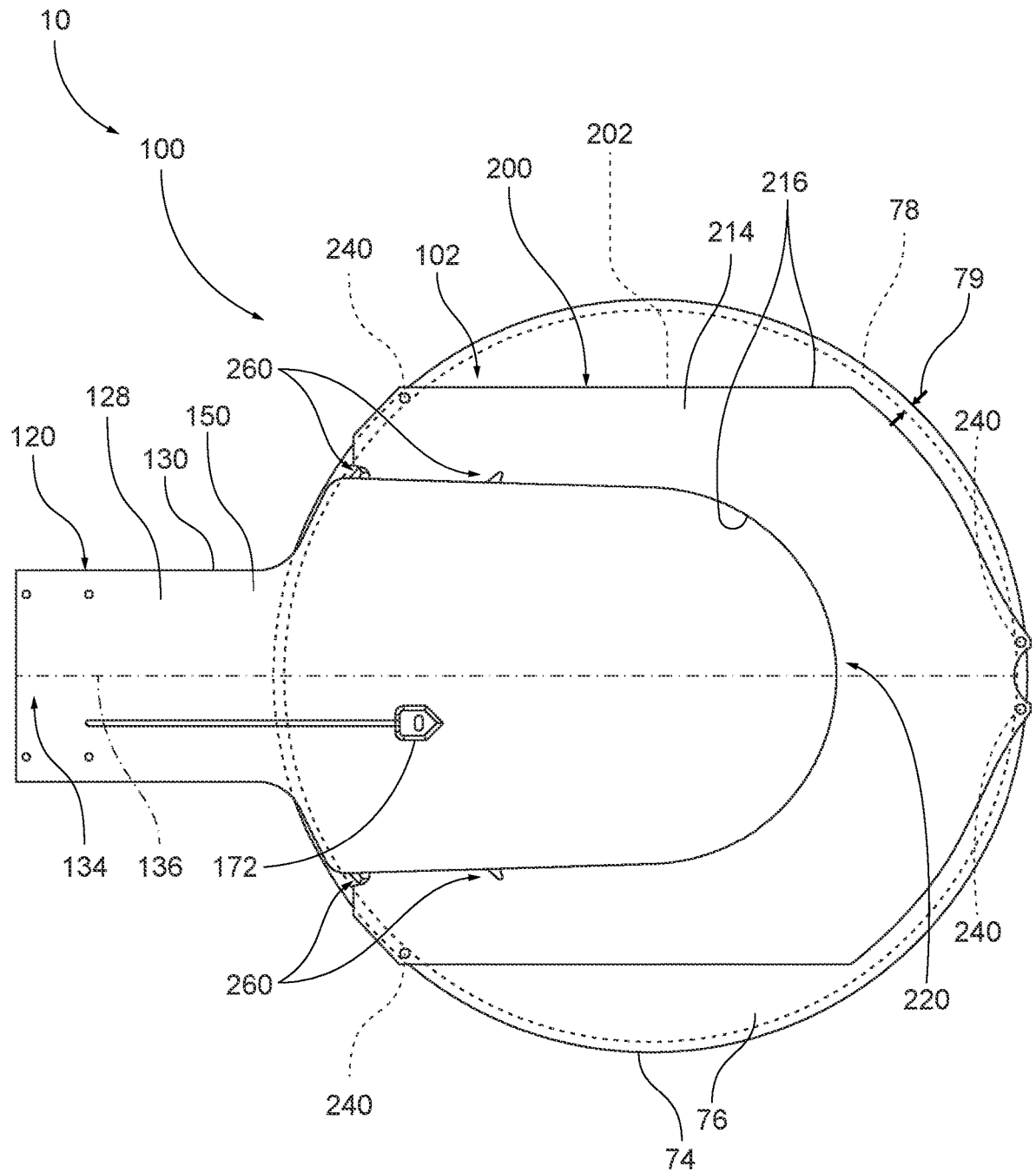
FIG. 5 is a less schematic top view illustrating an example of a wafer-handling end effector according to the present disclosure.
Figure 6:
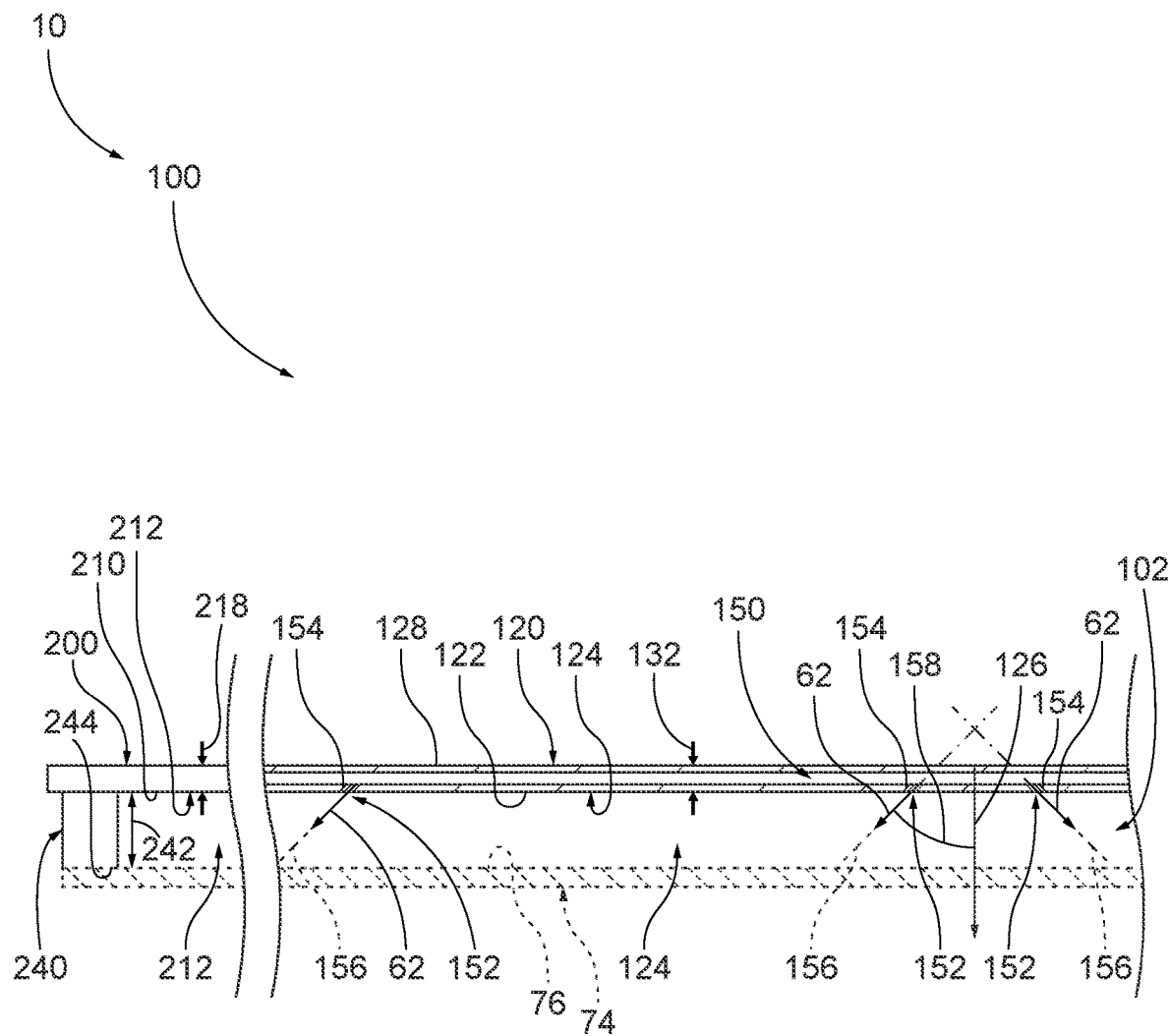
FIG. 6 is a cross-sectional view illustrating an example of a wafer-handling end effector according to the present disclosure.

As collectively illustrated by FIGS. 2-6, end effectors 100 include a blade 120, a surface extension 200, and an attachment mechanism 260. Blade 120 defines a wafer-facing blade side 122 and includes a gas distribution manifold 150 that is in fluid communication with the wafer-facing blade side. Surface extension 200 defines a wafer-facing extension side 210, which extends away from blade 120. As illustrated, surface extension 200 extends at least partially around wafer-facing blade side 122 and includes at least three projecting regions 240, which project from wafer-facing extension side 210 and may be configured to physically contact upper surface 76 of wafer 74 when the end effector selectively lifts the wafer, as illustrated in FIG. 6. As discussed in more detail herein, attachment mechanism 260 is configured to permit and/or facilitate selective attachment of surface extension 200 to blade 120 and selective separation of the surface extension from the blade.

Figure 2:
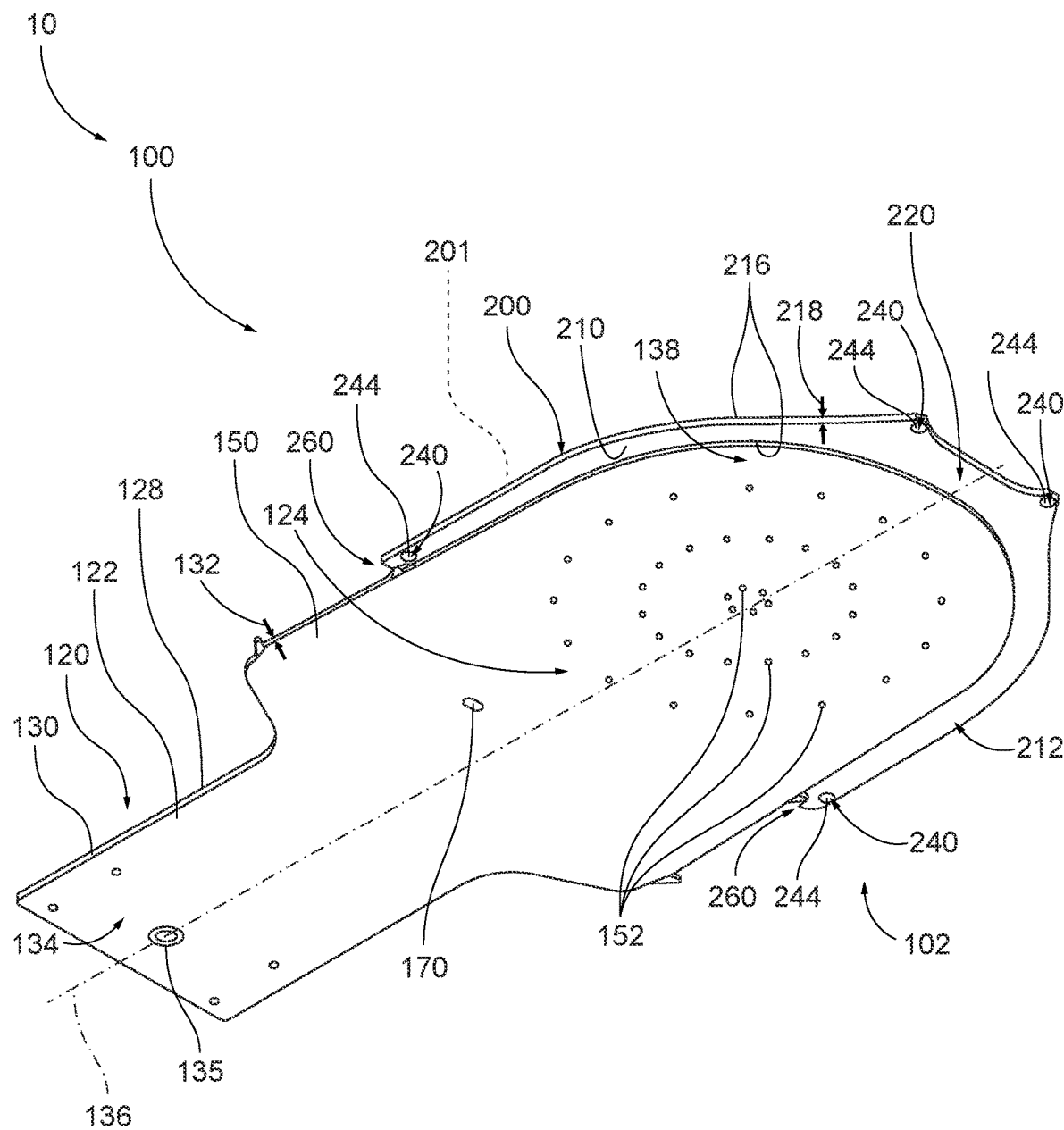
FIG. 2 is a less schematic profile view illustrating an example of a wafer-handling end effector according to the present disclosure.
Figure 3:
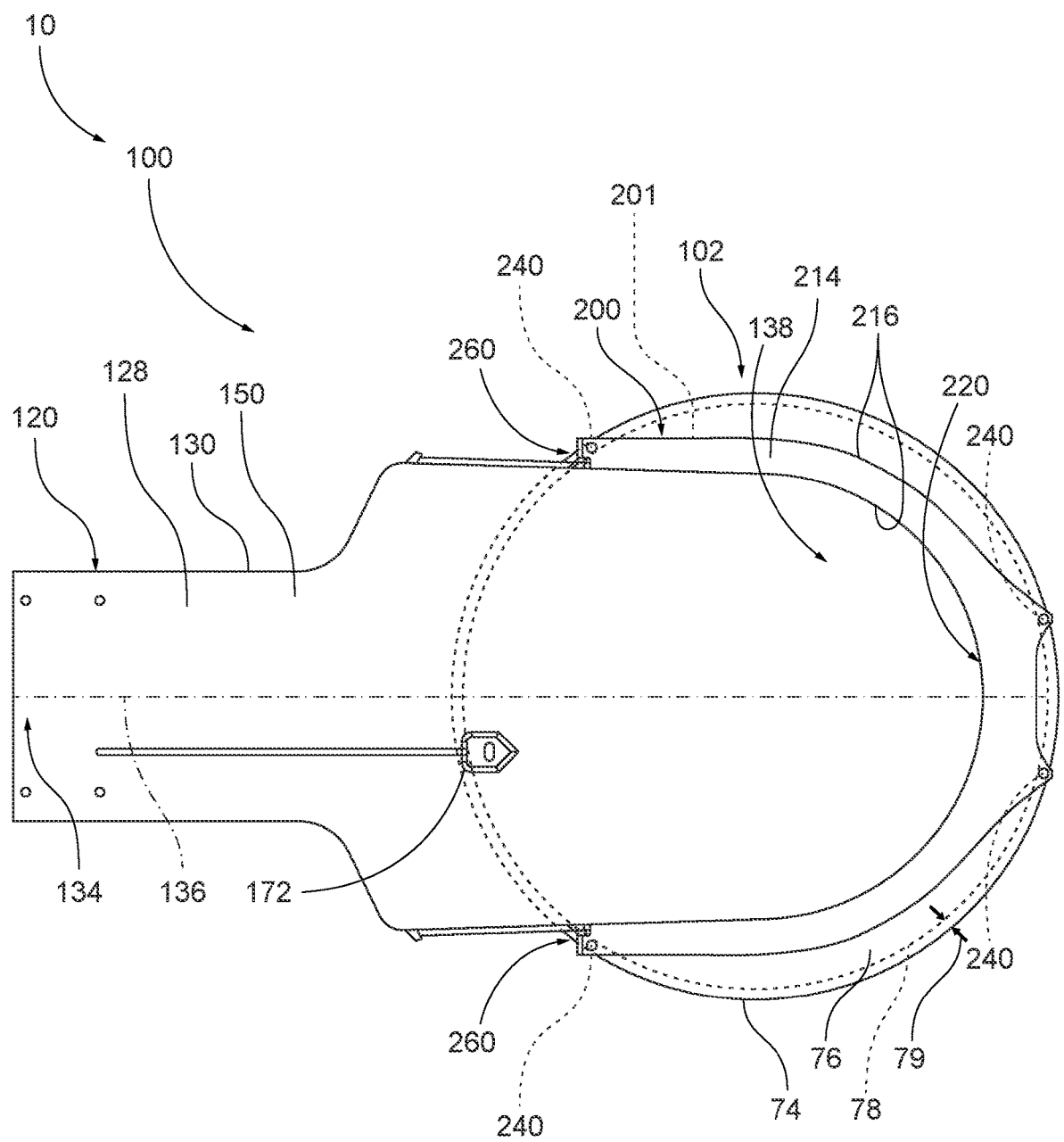
FIG. 3 is a less schematic top view illustrating an example of a wafer-handling end effector according to the present disclosure.

Because attachment mechanism 260 is configured to permit surface extension 200 to be selectively attached to, and separated from, blade 120, end effectors 100 may be adapted to a variety of different wafer sizes, or diameters, in a manner that is not feasible for conventional wafer-handling end effectors configured to lift the wafer from the upper surface of the wafer. As an example, a first 201 surface extension 200, such as may be illustrated in FIGS. 2-3, may be configured to lift relatively smaller wafers, such as 200 mm wafers, while a second 202 surface extension 200, such as may be illustrated in FIGS. 4-5, may be configured to lift relatively larger wafers, such as 300 mm wafers. With this in mind, a method of utilizing wafer-handling end effectors may include separating the first surface extension from blade 120 and attaching the second surface extension to the blade, thereby transitioning the wafer-handling end effector from the configuration that is illustrated in FIGS. 2-3 to the configuration that is illustrated in FIGS. 4-5. The first surface extension may define a first wafer-facing extension side 210 with a first wafer-facing extension surface area, and the second surface extension may define a second wafer-facing extension side 210 with a second wafer-facing extension surface area. The second wafer-facing extension surface area may differ from the first wafer-facing extension surface area. In particular, and in the example of FIGS. 2-5, the second wafer-facing extension surface area may be greater than the first wafer-facing extension surface area, thereby permitting end effector 100, when configured as illustrated in FIGS. 4-5, to lift larger diameter wafers when compared to when the end effector is configured as illustrated in FIGS. 2-3.

As an example, and with reference to FIGS. 2, 4, and 6, wafer-facing blade side 122 may define a blade-wafer overlap region 124, and wafer-facing extension side 210 may define an extension-wafer overlap region 212. Blade-wafer overlap region 124 and extension-wafer overlap region 212 together may define an overall overlap region 102 for end effector 100, which may be configured to face toward, and overlap with, upper surface 76 of wafer 74 when the end effector selectively lifts the wafer. To facilitate reliable generation of the pressure force, and thereby to permit reliable lifting of the wafer by the end effector, the size, or area, of overall overlap region 102 should correspond to, be based upon, and/or be proportional to the size, diameter, or area of upper surface 76 of wafer 74. The ability of blade 120 to accept surface extensions 200 of varying sizes, as illustrated by the transition between the configuration that is illustrated in FIGS. 2-3 and the configuration that is illustrated in FIGS. 4-5, permits the size, or area, of overall overlap region 102 to be adjusted as needed and/or based upon the size of wafer 74, thereby permitting and/or facilitating lifting wafers of correspondingly different sizes, or diameters, by end effector 100.

End effectors 100, according to the present disclosure, may provide additional and/or alternative benefits over conventional wafer-handling end effectors that are configured to lift the wafer from the upper surface of the wafer. As an example, the conventional end effector generally must be completely removed and replaced with a different conventional end effector in order for a conventional wafer-handling robot, which utilizes end effectors configured to lift the wafer from the upper surface of the wafer, to adapt to different wafer sizes. As discussed, this process requires that the conventional wafer-handling robot be re-taught for the new end effector, significantly increasing costs and/or down time associated with removing and replacing the conventional end effector. In contrast to conventional end effectors, wafer-handling end effectors 100, according to the present disclosure, include blade 120 and separately attachable and detachable surface extensions 200. Adapting end effectors 100 for different wafer sizes only requires that an appropriate surface extension 200 be attached to blade 120. Blade 120 is never detached and/or removed from the wafer-handling robot. As such, the wafer-handling robot need not be re-taught when a different surface extension 200 is attached to blade 120, thereby decreasing costs and down time associated with the change.

Blade 120 may include any suitable structure that may be adapted, configured, designed, sized, and/or constructed to define wafer-facing blade side 122, to include gas distribution manifold 150, and/or to be operatively attached to surface extension 200 via attachment mechanism 260. As illustrated in FIGS. 2-5, blade 120 may include a blade mounting structure 134. Blade mounting structure 134 may be configured to facilitate operative attachment of blade 120 to the wafer-handling robot. Examples of blade mounting structure 134 include any suitable hole, receptacle, clamp, fastener, and/or a hemispherical pan mechanism 135. The hemispherical pan mechanism may include an at least partially hemispherical recess, as perhaps best illustrated in FIGS. 2 and 4.

Blade 120 may include and/or be an elongate blade 120 that defines a longitudinal axis 136. Longitudinal axis 136 may extend from blade mounting structure 134 and into and/or through blade-wafer overlap region 124.

Blade 120 also may include and/or define an extension-receiving region 138, and surface extension 200 may extend around and/or surround the extension-receiving region, at least within a plane that extends parallel to wafer-facing blade side 122. Extension-receiving region 138 may have and/or define any suitable shape. As examples, extension-receiving region 138 may be an arcuate extension-receiving region, an at least partially circular extension-receiving region, a polygonal-shaped extension-receiving region, and/or an at least partially U-shaped extension-receiving region.

In addition to wafer-facing blade side 122, blade 120 may define a wafer-opposed blade side 128 and/or a blade edge 130, which may extend between the wafer-facing blade side and the wafer-opposed blade side. Blade edge 130 may form and/or define extension-receiving region 138 of blade 120. Wafer-facing blade side 122 may be a planar, or at least substantially planar, wafer-facing blade side. Similarly, wafer-opposed blade side 128 may be a planar, or at least substantially planar, wafer-opposed blade side. Such a configuration may permit and/or facilitate lifting of wafers by end effector 100 and/or insertion of the end effector into the wafer cassette, as discussed in more detail herein.

Blade 120 may define a blade thickness 132, or an average blade thickness 132, as illustrated in FIGS. 2, 3, and 6. Examples of blade thickness 132 include at least 0.5 mm, at least 0.75 mm, at least 1 mm, at least 1.25 mm, at least 1.5 mm, at least 1.75 mm, at least 2 mm, at least 2.5 mm, at least 3 mm, at least 3.5 mm, or at least 4 mm, at most 8 mm, at most 7 mm, at most 6 mm, at most 5 mm, at most 4.5 mm, at most 4 mm, at most 3.5 mm, at most 3 mm, at most 2.5 mm, and/or at most 2 mm.

Blade 120 and surface extension 200 may be formed and/or defined from any suitable material and/or materials. Blade 120 may be defined by a blade material and surface extension 200 may be defined by an extension material. In some examples, the blade material may be the same as, or similar to, the extension material. In some examples, the extension material may differ from the blade material. In a specific example, the blade material may include and/or be a metallic blade material; and the extension material may include and/or be a polymeric extension material. Examples of the polymeric extension material include a polyether ether ketone, a polyimide, and/or a polyamide. The polymeric extension material may permit and/or facilitate resilient deformation of surface extension 200 during attachment of the surface extension to the blade and/or during separation of the surface extension from the blade. However, it is within the scope of the present disclosure that the blade material and/or the extension material may be metallic, polymeric, ceramic, and/or defined by one or more other materials.

Gas distribution manifold 150 may include any suitable structure that may be formed and/or defined at least partially within and/or by blade 120 and/or that provides fluid communication with wafer-facing blade side 122 of blade 120. As an example, gas distribution manifold 150 may include a plurality of apertures 152, which may be defined within the wafer-facing blade side, as perhaps best illustrated in FIGS. 2, 4, and 6.

In some examples, and as perhaps best illustrated in FIGS. 2 and 4, apertures 152 may be arranged in a plurality of concentric circles. In some examples, the plurality of concentric circles may include 3, or optionally more than 3, concentric circles. When apertures 152 are arranged in the plurality of concentric circles, a corresponding subset of the plurality of apertures may be arranged in and/or may define each concentric circle of the plurality of concentric circles.

As perhaps best illustrated in FIG. 6, wafer-facing blade side 122 may define a wafer-facing blade side normal direction 126. In addition, each aperture 152 may extend from a corresponding fluid conduit 154 that may define a corresponding fluid flow axis 156 for flow of pressurized gas stream 62 therethrough and/or to wafer-facing blade side 122. Each corresponding fluid flow axis 156 may be oriented at a flow angle 158 relative to wafer-facing blade side normal direction 126. Examples of flow angle 158 include at least 30 degrees, at least 35 degrees, at least 40 degrees, at least 45 degrees, at least 50 degrees, at least 55 degrees, at least 60 degrees, at most 80 degrees, at most 75 degrees, at most 70 degrees, at most 65 degrees, and/or at most 60 degrees.

When apertures 152 are arranged in concentric circles and corresponding fluid flow axes 156 are orientated at flow angle 158, the corresponding fluid flow axis of each fluid conduit within a given concentric circle of the plurality of concentric circles may extend along an at least partially conic surface. Stated differently, fluid flow axes 156 of fluid conduits 154 within a given concentric circle all may intersect at a common point and may extend symmetrically and/or conically from the common point.

As perhaps best illustrated in FIGS. 2 and 4, blade 120 may include a wafer presence sensor opening 170. The wafer presence sensor opening may be defined within blade-wafer overlap region 124. Stated differently, and when the end effector selectively lifts the wafer, the wafer may extend across wafer presence sensor opening 170. As perhaps best illustrated in FIGS. 3 and 5, a wafer presence sensor 172 may be positioned at least partially within and/or proximate wafer presence sensor opening 170, may be configured to detect when the wafer extends across the wafer presence sensor opening, and/or may be configured to detect the presence of the wafer via the wafer presence sensor opening. Stated differently, the wafer presence sensor may be configured to detect the wafer when the end effector selectively lifts the wafer. Examples of the wafer presence sensor include an optical sensor and/or a capacitive sensor.

Surface extension 200 may include any suitable structure that defines wafer-facing extension side 210 and/or that includes the at least three projecting regions 240. In some examples, wafer-facing extension side 210 may include and/or be a planar, or at least substantially planar, wafer-facing extension side. In some examples, the wafer-facing extension side may extend parallel to, or may be coplanar with, wafer-facing blade side 122 when the surface extension is operatively attached to the blade via the attachment mechanism.

Surface extension 200 may define a wafer-opposed extension side 214 and an extension edge 216 that extends between wafer-facing extension side 210 and wafer-opposed extension side 214. Wafer-opposed extension side 214 may include and/or be a planar, or at least substantially planar wafer-opposed extension side 214 and/or may extend parallel, or at least substantially parallel, to wafer-facing extension side 210.

Wafer extension 200 may define an extension thickness, or an average extension thickness, 218, as illustrated in FIGS. 2, 4, and 6. Extension thickness 218 may be measured between wafer-facing extension side 210 and wafer-opposed extension side 214. Extension thickness 218 may be similar, or equal, to blade thickness 132. Examples of a ratio of extension thickness 218 to blade thickness 132 include at least 0.5, at least 0.6, at least 0.7, at least 0.8, at least 0.9, at least 1, at most 2, at most 1.8, at most 1.6, at most 1.4, at most 1.2, at most 1, and/or 1.

Surface extension 200 may define a blade-receiving region 220, and blade 120 may extend within the blade-receiving region, at least when the surface extension is operatively attached to the blade via attachment mechanism 260. The blade-receiving region may be defined by extension edge 216 of surface extension 200 and/or may be shaped to receive extension-receiving region 138 of blade 120. With this in mind, a shape of blade-receiving region 220 may correspond to, or complement, a shape of extension-receiving region 138. Examples of the shape of the blade-receiving region include an arcuate blade-receiving region, an at least partially circular blade-receiving region, and/or an at least partially U-shaped blade-receiving region.

Projecting regions 240 may include any suitable structure and/or shape that may project from wafer-facing extension side 210, that may project toward the wafer when the end effector selectively lifts the wafer, and/or that may be configured to physically contact the upper surface of the wafer when the end effector selectively lifts the wafer. Surface extension 200 may include any suitable number of projecting regions 240, including three projecting regions, four projecting regions, five projecting regions, or six projecting regions. As illustrated in FIGS. 2 and 4, projecting regions 240 may be symmetrically positioned about longitudinal axis 136 of blade 120.

Projecting regions 240 may be configured to physically contact the upper surface of the wafer in any suitable manner. As an example, projecting regions 240 may be configured to physically contact upper surface 76 of the wafer 74 within an edge exclusion zone 78 of the wafer, as perhaps best illustrated in FIGS. 1, 3, and 5. As used herein, the phrase "edge exclusion zone" may include and/or be an annular region that is within a threshold exclusion distance 79 of an outer perimeter of the wafer and/or within which integrated circuit devices 75 are not present. Examples of the threshold exclusion distance include at most 2 mm, at most 3 mm, at most 4 mm, or at most 5 mm.

When end effectors 100 include projecting regions 240 that are configured to contact upper surface 76 of wafer 74 within edge exclusion zone 78, the ability of end effectors 100 to utilize different surface extensions 200 and/or to exchange one surface extension 200 for a different surface extension 200 may provide additional benefits over conventional wafer-handling end effectors configured to selectively lift corresponding wafers from the upper surface thereof. As an example, and as perhaps best illustrated by a comparison between FIG. 3 and FIG. 5, a location of projecting regions 240 may vary, or may be selected, such that, for a given surface extension 200, corresponding projecting regions 240 contact a corresponding wafer size, or wafer diameter, within a corresponding edge exclusion zone 78 of that wafer size.

As an example, projecting regions 240 may be at least partially, or even completely, positioned within an annular region that corresponds to the shape of the corresponding edge exclusion zone. Additionally or alternatively, projecting regions 240 may extend only within a region that is radially outward from an inner perimeter of the edge of the corresponding edge exclusion zone. Thus, and as illustrated, a size and/or diameter of this annular region may vary based upon the size and/or diameter of the wafer that the given surface extension is configured to lift.

As perhaps best illustrated in FIG. 6, projecting regions 240 may project a projection distance 242 from wafer-facing extension side 210 of surface extension 200. Because end effector 100 utilizes positive air flow from gas distribution manifold 150 to generate the pressure force that lifts the wafer, the wafer naturally may be suspended, or may float, a float distance from the end effector, with this float distance being defined by a variety of parameters, including the surface area of overall overlap region 102, the weight of the wafer, and the flow rate of the positive air flow (i.e., pressurized gas streams 62). Stated differently, end effector 100 may be configured to lift wafer 74 without direct physical contact between wafer-facing blade side 122 and the wafer and/or without direct physical contact between wafer-facing extension side 210 and the wafer.

With this in mind, projection distance 242 may be selected to be greater than this float distance. As such, the pressure force may pull the wafer into contact with projecting regions 240, thereby providing a static friction force between a projection end 244 of the projecting regions and the wafer. This static friction force may resist sliding motion between the end effector and the wafer and retains the wafer on the end effector as the end effector moves within the probe system. Examples of the projection distance include at least 0.1 mm, at least 0.2 mm, at least 0.3 mm, at least 0.4 mm, at least 0.5 mm, at least 0.6 mm, at least 0.7 mm, at least 0.8 mm, at least 0.9 mm, at least 1 mm, at most 1.5 mm, at most 1.4 mm, at most 1.3 mm, at most 1.2 mm, at most 1.1 mm, at most 1 mm, at most 0.9 mm, at most 0.8 mm, at most 0.7 mm, at most 0.6 mm, and/or at most 0.5 mm.

Projection ends 244 of projecting regions 240 may have and/or define any suitable shape and/or relative orientation. As an example, projection ends 244 may be planar, or at least substantially planar, projection ends 244. As another example, the projection end of each projecting region 240 may be coplanar, or at least substantially coplanar, with the projection end of each other projecting region 240 and/or may be parallel, or at least substantially parallel, to wafer-facing extension side 210.

As discussed, end effectors 100 may be configured to utilize different surface extensions 200, of different sizes and/or shapes, such as to facilitate lifting wafers of differing shapes, sizes, and/or diameters. With this in mind, and in some examples, end effectors 100 may include a plurality of surface extensions 200, each of which may be configured to be individually and selectively attached to and/or separated from blade 120, or a single blade 120. As an example, the plurality of surface extensions may include first 201 surface extension 200 that is illustrated in FIG. 2 and second 202 surface extension 200 that is illustrated in FIG. 4. Stated differently, end effectors 100 may include a first surface extension, such as surface extension 200 that is illustrated in FIG. 2, and a second surface extension, such as surface extension 200 that is illustrated in FIG. 4. It is within the scope of the present disclosure that end effectors 100 may include additional surface extensions, such as three, four, five, or more than five surface extensions, each of which may be configured to be individually and selectively attached to and/or separated from blade 120, such as to lift wafers of three, four, five, or more than five sizes and/or diameters.

In such a configuration, attachment mechanism 260 may be configured to permit and/or facilitate selective attachment and selective separation of the first surface extension or the second surface extension at a given point in time. However, the end effector may not be configured to utilize both the first surface extension and the second surface extension simultaneously.

The first surface extension may define a first surface extension shape, while the second surface extension may define a second surface extension shape that differs from the first surface extension shape. As an example, the first surface extension may be sized, shaped, and/or configured to lift a first wafer with a first diameter, such as 200 mm, and the second surface extension may be sized, shaped, and/or configured to lift a second wafer with a second diameter, such as 300 mm, that differs from the first diameter.

As discussed, projecting regions 240 may be configured to physically contact the upper surface of the wafer within the edge exclusion zone of the wafer. With this in mind, the first surface extension may include at least three first projecting regions, the second surface extension may include at least three second projecting regions, and a relative orientation of the at least three first projecting regions may differ from a relative orientation of the at least three second projecting regions. As an example, the relative orientation of the at least three first projecting regions may be such that the at least three first projecting regions contact a 200 mm wafer within a corresponding 200 mm wafer edge exclusion zone, while the relative orientation of the at least three second projecting regions may be such that the at least three second projecting regions contact a 300 mm wafer within a corresponding 300 mm wafer edge exclusion zone.

Stated differently, the at least three first projecting regions may be arranged to contact an annular surface with an outer diameter of 200 mm and a width defined by the threshold exclusion zone distance. In contrast, the at least three second projecting regions may be arranged to contact an annular surface with an outer diameter of 300 mm and a width defined by the threshold exclusion zone distance. Wafers with outer diameters of 200 mm and 300 mm are discussed herein as examples, and it is within the scope of the present disclosure that end effectors 100 may be configured to lift wafers with other diameters and/or that the at least three projecting regions 240 may be configured to contact corresponding edge exclusion zones of wafers with other diameters. Examples of such other diameters include diameters of, or of nominally, 25 mm, 50 mm, 75 mm, 100 mm, 125 mm, 150 mm, 200 mm, 300 mm, and/or 450 mm.

Attachment mechanism 260 may include any suitable structure that may be adapted, configured, designed, shaped, sized, and/or constructed to permit and/or to facilitate selective attachment of surface extension 200 to blade 120 and selective separation of the surface extension from the blade. Examples of attachment mechanism 260 include a clasp, a lever, a cam, a fastener, a keyed region, a projecting region, a recessed region, a friction fit, a resilient fit, an adhesive connection, a magnetic connection, a vacuum connection, and/or an electrostatic connection.

Overall overlap region 102 may define an overall overlap surface area that may be a threshold overlap fraction of a wafer surface area of the upper surface of the wafer. Stated differently, end effector 100 may overlap with the threshold overlap fraction of the upper surface of the wafer. Examples of the threshold overlap fraction include at least 50%, at least 55%, at least 60%, at least 65%, at least 70%, at least 75%, at least 80%, at least 85%, at most 95%, at most 92.5%, at most 90%, at most 87.5%, at most 85%, at most 82.5%, and/or at most 80%. The threshold overlap surface area and/or the threshold overlap fraction may be selected to provide a desired normal force between projecting regions 240 and the upper surface of the wafer when the end effector selectively lifts the wafer. As an example, the threshold overlap surface area and/or the threshold overlap fraction may be increased to increase the normal force and/or may be decreased to decrease the normal force.

Blade-wafer overlap region 124 may have and/or define a blade-wafer overlap region area that may be a threshold blade overlap region fraction of the overall overlap area. Examples of the threshold blade overlap region fraction include at least 25%, at least 30%, at least 35%, at least 40%, at least 45%, at least 50%, at least 55%, at least 60%, at least 65%, at least 70%, at least 75%, at least 80%, at least 85%, at most 95%, at most 90%, at most 85%, at most 80%, at most 75%, at most 70%, at most 65%, at most 60%, at most 55%, at most 50%, at most 45%, and/or at most 40%. The threshold blade overlap region fraction may vary depending upon a size of surface extension 200.

Figure 7:
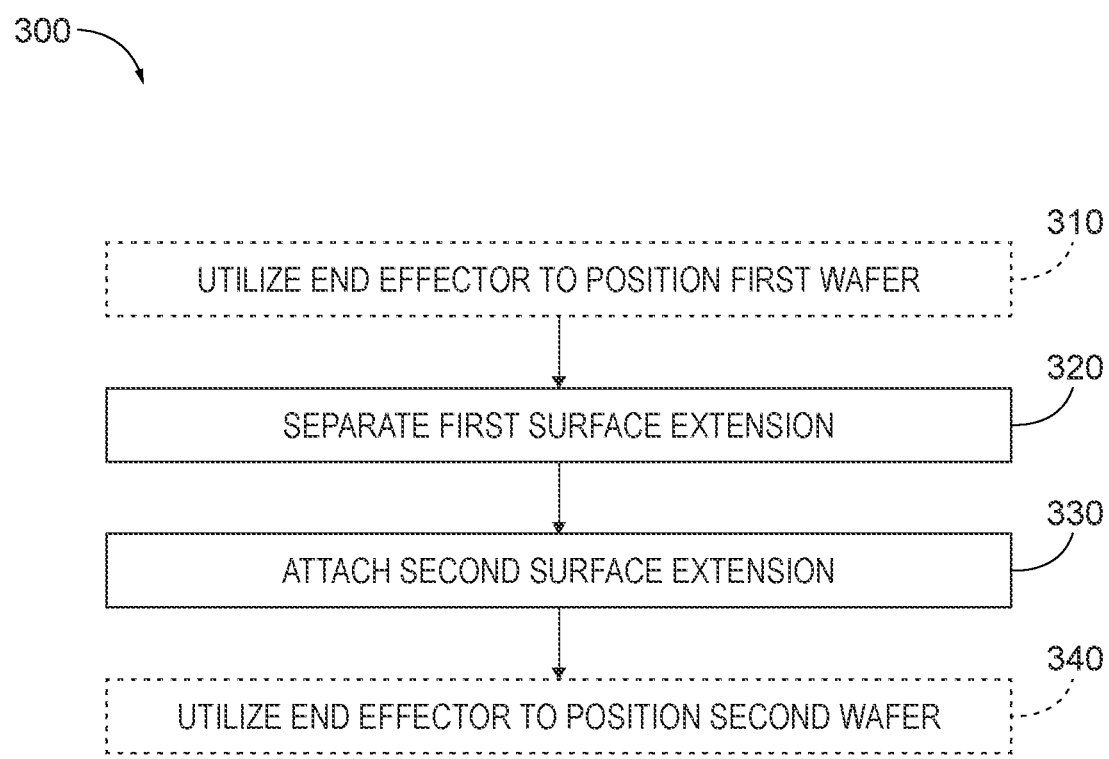
FIG. 7 is a flowchart depicting examples of methods of utilizing a wafer-handling end effector, according to the present disclosure.

FIG. 7 is a flowchart depicting examples of methods 300 of utilizing a wafer-handling end effector, according to the present disclosure, to selectively lift a wafer from an upper surface of the wafer and/or via a pressure force. Methods 300 may include utilizing the end effector to position a first wafer at 310 and include separating a first surface extension at 320. Methods 300 also include attaching a second surface extension at 330 and may include utilizing the end effector to position a second wafer at 340.

The separating at 320 may include separating a first surface extension from a blade of the end effector. Examples of the first surface extension and the blade are disclosed herein. The first surface extension may define a first wafer-facing extension side with a first wafer-facing extension surface area. In some examples, the separating at 320 includes resiliently deforming the first surface extension.

The attaching at 330 may include attaching a second surface extension to the blade of the end effector. Examples of the second surface extension are disclosed herein. The second surface extension may define a second wafer-facing extension side with a second wafer-facing extension surface area. The second wafer-facing extension surface area may differ from, may be less than, and/or may be greater than the first wafer-facing extension surface area. In some examples, the attaching at 330 may include resiliently deforming the second surface extension. In some examples, the attaching at 330 may include attaching with, via, and/or utilizing an attachment mechanism of the end effector, examples of which are disclosed herein.

It is within the scope of the present disclosure that methods 300 may include performing the separating at 320 and the attaching at 330 while the blade is affixed to a wafer-handling robot. This may facilitate lifting the wafer and/or performing the utilizing at 340 subsequent to the attaching at 330 and without, or without a need to, first teach the robot.

The utilizing at 310, which may include utilizing the end effector to position the first wafer within and/or relative to a probe system. The utilizing at 340 may include utilizing the end effector to position the second wafer within and/or relative to the probe system. The first wafer may have a first diameter, and the second wafer may have a second diameter, which differs from the first diameter. The utilizing at 310 may be performed prior to the separating at 320 and the utilizing at 340 may be performed subsequent to the attaching at 330. As such, the separating at 320 and the attaching at 330 may be utilized to adjust and/or to adapt the end effector from the first wafer of the first diameter to the second wafer of the second diameter.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of wafer-handling end effectors, probe systems, and methods, according to the present disclosure, are presented in the following enumerated paragraphs. It is within the scope of the present disclosure that an individual step of a method recited herein, including in the following enumerated paragraphs, may additionally or alternatively be referred to as a "step for" performing the recited action.

A1. A wafer-handling end effector configured to selectively lift a wafer from an upper surface of the wafer via a pressure force, the end effector comprising:

a blade that defines a wafer-facing blade side, wherein the blade includes a gas distribution manifold in fluid communication with the wafer-facing blade side;

a surface extension that defines a wafer-facing extension side that extends away from the blade, wherein the surface extension extends at least partially around the wafer-facing blade side, and further wherein the surface extension includes at least three projecting regions that project from the wafer-facing extension side; and an attachment mechanism configured to permit selective attachment of the surface extension to the blade and selective separation of the surface extension from the blade;

optionally wherein the wafer-facing blade side defines a blade-wafer overlap region, wherein the wafer-facing extension side defines an extension-wafer overlap region, wherein the blade-wafer overlap region and the extension-wafer overlap region together define an overall wafer overlap region of the end effector, and further wherein the overall wafer overlap region is configured to face toward, and overlap with, the upper surface of the wafer when the end effector selectively lifts the wafer; and optionally wherein the at least three projecting regions are configured to physically contact the upper surface of the wafer when the end effector selectively lifts the wafer.

A2. The end effector of paragraph A1, wherein the blade further includes a blade mounting structure configured to facilitate operative attachment of the blade to a wafer-handling robot.

A3. The end effector of any of paragraphs A1-A2, wherein the blade is an elongate blade that defines a longitudinal axis.

A4. The end effector of paragraph A3, wherein the longitudinal axis extends from a/the blade mounting structure of the blade and into the blade-wafer overlap region.

A5. The end effector of any of paragraphs A1-A4, wherein the blade includes an extension-receiving region, and further wherein the surface extension extends around the extension-receiving region.

A6. The end effector of paragraph A5, wherein the extension-receiving region is at least one of:
(i) an arcuate extension-receiving region;
(ii) an at least partially circular extension-receiving region;
(iii) an at least partially U-shaped extension-receiving region; and
(iv) a polygonal-shaped extension-receiving region.

A7. The end effector of any of paragraphs A1-A6, wherein the wafer-facing blade side is a planar, or at least substantially planar, wafer-facing blade side.

A8. The end effector of any of paragraphs A1-A7, wherein the blade defines a wafer-opposed blade side and a blade edge that extends between the wafer-facing blade side and the wafer-opposed blade side.

A9. The end effector of paragraph A8, wherein the wafer-opposed blade side is a planar, or at least substantially planar, wafer-opposed blade side.

A10. The end effector of any of paragraphs A8-A9, wherein the blade edge defines an/the extension-receiving region of the blade.

A11. The end effector of any of paragraphs A8-A10, wherein the blade defines a blade thickness, or an average blade thickness, between the wafer-facing blade side and the wafer-opposed blade side.

A12. The end effector of paragraph A11, wherein the blade thickness is at least one of:
(i) at least 0.5 millimeters (mm), at least 0.75 mm, at least 1 mm, at least 1.25 mm, at least 1.5 mm, at least 1.75 mm, at least 2 mm, at least 2.5 mm, at least 3 mm, at least 3.5 mm, or at least 4 mm; and
(ii) at most 8 mm, at most 7 mm, at most 6 mm, at most 5 mm, at most 4.5 mm, at most 4 mm, at most 3.5 mm, at most 3 mm, at most 2.5 mm, or at most 2 mm.

A13. The end effector of any of paragraphs A1-A12, wherein the blade is defined by a blade material, and further wherein the surface extension is defined by an extension material, optionally wherein the extension material is the same as the blade material, and further optionally wherein the extension material differs from the blade material.

A14. The end effector of paragraph A13, wherein the blade material is at least one of a metallic blade material, a polymeric blade material, and a ceramic blade material.

A15. The end effector of any of paragraphs A13-A14, wherein the extension material is at least one of a metallic extension material, a polymeric extension material, and a ceramic extension material.

A16. The end effector of any of paragraphs A1-A15, wherein the gas distribution manifold includes a plurality of apertures defined within the wafer-facing blade side.

A17. The end effector of paragraph A16, wherein the plurality of apertures is arranged in a plurality of concentric circles.

A18. The end effector of paragraph A17, wherein the plurality of concentric circles includes at least three concentric circles.

A19. The end effector of any of paragraphs A17-A18, wherein a corresponding subset of the plurality of apertures is arranged in each concentric circle of the plurality of concentric circles.

A20. The end effector of any of paragraphs A16-A19, wherein the wafer-facing blade side defines a wafer-facing blade side normal direction, wherein the plurality of apertures extends from a plurality of corresponding fluid conduits, wherein each fluid conduit of the plurality of corresponding fluid conduits defines a corresponding fluid flow axis, and further wherein the corresponding fluid flow axis of each fluid conduit is oriented at a corresponding flow angle relative to the wafer-facing blade side normal direction.

A21. The end effector of paragraph A20, wherein the corresponding flow angle is at least one of:
(i) at least 30 degrees, at least 35 degrees, at least 40 degrees, at least 45 degrees, at least 50 degrees, at least 55 degrees, or at least 60 degrees; and
(ii) at most 80 degrees, at most 75 degrees, at most 70 degrees, at most 65 degrees, or at most 60 degrees.

A22. The end effector of any of paragraphs A20-A21, wherein the plurality of apertures is arranged in a/the plurality of concentric circles, and further wherein the corresponding flow angle of each fluid conduit of each aperture within a given concentric circle of the plurality of concentric circles extends along an at least partially conic surface.

A23. The end effector of any of paragraphs A16-A22, wherein the gas distribution manifold is configured to provide a pressurized gas stream to the wafer-facing blade side via the plurality of apertures.

A24. The end effector of any of paragraphs A1-A23, wherein the gas distribution manifold is configured such that the wafer-handling end effector selectively lifts the wafer via at least one of the Bernoulli effect and the cyclone effect.

A25. The end effector of any of paragraphs A1-A24, wherein the blade further includes a wafer presence sensor opening defined within the blade-wafer overlap region.

A26. The end effector of paragraph A25, wherein the end effector further includes a wafer presence sensor configured to detect the wafer when the end effector selectively lifts the wafer.

A27. The end effector of any of paragraphs A1-A26, wherein the wafer-facing extension side is coplanar, or at least substantially coplanar, with the wafer-facing blade side.

A28. The end effector of any of paragraphs A1-A27, wherein the wafer-facing extension side is a planar wafer-facing extension side.

A29. The end effector of any of paragraphs A1-A28, wherein the wafer-facing extension side extends parallel, or at least substantially parallel, to the wafer-facing blade side.

A30. The end effector of any of paragraphs A1-A29, wherein the surface extension defines a wafer-opposed extension side and an extension edge that extends between the wafer-facing extension side and the wafer-opposed extension side.

A31. The end effector of paragraph A30, wherein the wafer-opposed extension side is a planar, or at least substantially planar, wafer-opposed extension side.

A32. The end effector of any of paragraphs A30-A31, wherein the surface extension defines an extension thickness, or an average extension thickness, between the wafer-facing extension side and the wafer-opposed extension side.

A33. The end effector of paragraph A32, wherein a ratio of the extension thickness to a/the blade thickness of the blade is at least one of:
(i) at least 0.5, at least 0.6, at least 0.7, at least 0.8, at least 0.9, or at least 1; and
(ii) at most 2, at most 1.8, at most 1.6, at most 1.4, at most 1.2, or at most 1.

A34. The end effector of any of paragraphs A1-A33, wherein the surface extension defines a blade-receiving region, and further wherein the blade extends within the blade-receiving region.

A35. The end effector of paragraph A34, wherein the blade-receiving region is at least one of:
(i) an arcuate blade-receiving region;
(ii) an at least partially circular blade-receiving region; and
(iii) an at least partially U-shaped blade-receiving region.

A36. The end effector of any of paragraphs A34-A35, wherein the blade-receiving region is shaped to receive an/the extension-receiving region of the blade.

A37. The end effector of any of paragraphs A34-A36, wherein the blade-receiving region is defined by an/the extension edge of the surface extension.

A38. The end effector of any of paragraphs A1-A37, wherein the at least three projecting regions includes three, four, five, or six projecting regions.

A39. The end effector of any of paragraphs A1-A38, wherein the at least three projecting regions project toward the wafer when the end effector selectively lifts the wafer.

A40. The end effector of any of paragraphs A1-A39, wherein the at least three projecting regions are symmetrically positioned about a/the longitudinal axis of the blade.

A41. The end effector of any of paragraphs A1-A40, wherein the at least three projecting regions are configured to physically contact the upper surface of the wafer within an edge exclusion zone of the wafer.

A42. The end effector of paragraph A41, wherein the edge exclusion zone of the wafer is defined within an annular region that is within a threshold exclusion distance of an outer perimeter of the wafer, optionally wherein the threshold exclusion distance is at most 2 mm, at most 3 mm, at most 4 mm, or at most 5 mm.

A43. The end effector of any of paragraphs A1-A42, wherein the at least three projecting regions project a threshold projection distance from the wafer-facing extension side, optionally wherein the threshold projection distance is at least one of:
(i) at least 0.1 mm, at least 0.2 mm, at least 0.3 mm, at least 0.4 mm, at least 0.5 mm, at least 0.6 mm, at least 0.7 mm, at least 0.8 mm, at least 0.9 mm, or at least 1 mm; and
(ii) at most 1.5 mm, at most 1.4 mm, at most 1.3 mm, at most 1.2 mm, at most 1.1 mm, at most 1 mm, at most 0.9 mm, at most 0.8 mm, at most 0.7 mm, at most 0.6 mm, or at most 0.5 mm.

A44. The end effector of any of paragraphs A1-A43, wherein, when the end effector selectively lifts the wafer, the at least three projecting regions are configured to resist sliding motion relative to the wafer via a static friction force between the wafer and a projection end of each of the at least three projecting regions.

A45. The end effector of any of paragraphs A1-A44, wherein a/the projection end of each of the at least three projecting regions is a planar, or at least substantially planar, projection end.

A46. The end effector of any of paragraphs A1-A45, wherein a/the projection end of each of the at least three projecting regions is coplanar with a projection end of each other of the at least three projecting regions.

A47. The end effector of any of paragraphs A1-A46, wherein the end effector includes a plurality of surface extensions, and further wherein each surface extension of the plurality of surface extensions is configured to be individually and selectively attached to the blade and individually and selectively separated from the blade via the attachment mechanism.

A48. The end effector of any of paragraphs A1-A47, wherein the surface extension is a first surface extension, and further wherein the end effector includes a second surface extension.

A49. The end effector of paragraph A48, wherein the end effector is configured such that the attachment mechanism permits selective attachment and selective separation of one, or only one, of the first surface extension and the second surface extension to the blade at a given time.

A50. The end effector of any of paragraphs A48-A49, wherein the first surface extension defines a first surface extension shape, and further wherein the second surface extension defines a second surface extension shape that differs from the first surface extension shape.

A51. The end effector of any of paragraphs A48-A50, wherein the first surface extension is sized to permit the end effector to selectively lift a first wafer with a first diameter, and further wherein the second surface extension is sized to permit the end effector to selectively lift a second wafer with a second diameter that differs from the first diameter.

A52. The end effector of any of paragraphs A48-A51, wherein the first surface extension is sized to permit the end effector to selectively lift one of a 25 mm diameter wafer, a 50 mm diameter wafer, a 75 mm diameter wafer, a 100 mm diameter wafer, a 125 mm diameter wafer, a 150 mm diameter wafer, a 200 mm diameter wafer, a 300 mm diameter wafer, or a 450 mm diameter wafer, and further wherein the second surface extension is sized to permit the end effector to selectively lift another of the 25 mm diameter wafer, the 50 mm diameter wafer, the 75 mm diameter wafer, the 100 mm diameter wafer, the 125 mm diameter wafer, the 150 mm diameter wafer, the 200 mm diameter wafer, the 300 mm diameter wafer, or the 450 mm diameter wafer.

A53. The end effector of any of paragraphs A48-A52, wherein the first surface extension includes at least three first projecting regions, wherein the second surface extension includes at least three second projecting regions, and further wherein a relative orientation of the at least three first projecting regions differs from a relative orientation of the at least three second projecting regions.

A54. The end effector of paragraph A53, wherein the relative orientation of the at least three first projecting regions is such that the at least three first projecting regions contact one of a/the 25 mm diameter wafer, a/the 50 mm diameter wafer, a/the 75 mm diameter wafer, a/the 100 mm diameter wafer, a/the 125 mm diameter wafer, a/the 150 mm diameter wafer, a/the 200 mm diameter wafer, a/the 300 mm diameter wafer, or a/the 450 mm diameter wafer within a corresponding wafer edge exclusion zone, and further wherein the relative orientation of the at least three second projecting regions is such that the at least three second projecting regions contact another of the 25 mm diameter wafer, the 50 mm diameter wafer, the 75 mm diameter wafer, the 100 mm diameter wafer, the 125 mm diameter wafer, the 150 mm diameter wafer, the 200 mm diameter wafer, the 300 mm diameter wafer, or the 450 mm diameter wafer within a corresponding wafer edge exclusion zone.

A55. The end effector of any of paragraphs A1-A54, wherein the attachment mechanism includes at least one of a clasp, a lever, a cam, a fastener, a keyed region, a projecting region, a recessed region, a friction fit, a resilient fit, an adhesive connection, a magnetic connection, a vacuum connection, and an electrostatic connection.

A56. The end effector of any of paragraphs A1-A55, wherein an overall overlap surface area of the overall wafer overlap region is a threshold overlap fraction of a wafer surface area of the upper surface of the wafer, wherein the threshold overlap fraction is at least one of:
  (i) at least 50%, at least 55%, at least 60%, at least 65%, at least 70%, at least 75%, at least 80%, or at least 85%; and
  (ii) at most 95%, at most 92.5%, at most 90%, at most 87.5%, at most 85%, at most 82.5%, or at most 80%.

A57. The end effector of any of paragraphs A1-A56, wherein a/the overall overlap surface area of the overall wafer overlap region is selected to provide a desired normal force between the at least three projecting regions and the upper surface of the wafer when the end effector selectively lifts the wafer.

A58. The end effector of any of paragraphs A1-A57, wherein the blade-wafer overlap region has a blade-wafer overlap region area that is a threshold blade overlap region fraction of an/the overall overlap surface area, and further wherein the threshold blade overlap region fraction is at least one of:
  (i) at least 25%, at least 30%, at least 35%, at least 40%, at least 45%, at least 50%, at least 55%, at least 60%, at least 65%, at least 70%, at least 75%, at least 80%, or at least 85%; and
  (ii) at most 95%, at most 90%, at most 85%, at most 80%, at most 75%, at most 70%, at most 65%, at most 60%, at most 55%, at most 50%, at most 45%, or at most 40%.

A59. The end effector of any of paragraphs A1-A58, wherein the end effector is sized for clearance within a wafer cassette that is configured to contain a plurality of wafers.

A60. The end effector of any of paragraphs A1-A59, wherein the end effector is configured to lift the wafer without direct physical contact between at least one of:
  (i) the wafer-facing blade side and the wafer; and
  (ii) the wafer-facing extension side and the wafer.

A61. The end effector of any of paragraphs A1-A60, wherein the end effector includes the wafer.

B1. A probe system configured to test a wafer that includes an integrated circuit device, the probe system comprising:
  a chuck that defines a support surface configured to support the wafer;
  a signal generation and analysis assembly configured to generate a test signal and to receive a resultant signal;
  a probe assembly configured to at least one of:
    (i) receive the test signal from the signal generation and analysis assembly and provide the test signal to the integrated circuit device; and
    (ii) receive the resultant signal from the integrated circuit device and provide the resultant signal to the signal generation and analysis assembly; and a wafer-handling robot configured to position the wafer within the probe system, wherein the wafer-handling robot includes the end effector of any of paragraphs A1-A61.

B2. The probe system of paragraph B1, wherein the probe system further includes a wafer cassette docking port configured to receive a wafer cassette that includes the wafer.

B3. The probe system of paragraph B2, wherein the wafer-handling robot is configured to at least one of:
  (i) transfer the wafer from the wafer cassette to the chuck; and
  (ii) transfer the wafer from the chuck to the wafer cassette.

B4. The probe system of any of paragraphs B1-B3, wherein the probe system further includes a pressurized gas source configured to selectively provide a pressurized gas stream to the gas distribution manifold to generate the pressure force that selectively lifts the wafer.

B5. The probe system of any of paragraphs B1-B4, wherein at least one of:
  (i) the support surface faces upward;
  (ii) the upper surface of the wafer faces upward;
  (iii) the wafer-facing blade side faces downward; and
  (iv) the wafer-facing extension side faces downward.

C1. A method of utilizing a wafer-handling end effector configured to selectively lift a wafer from an upper surface of the wafer via a pressure force, the method comprising:
  separating, from a blade of the wafer-handling end effector, a first surface extension that defines a first wafer-facing extension side with a first wafer-facing extension surface area; and
  attaching, to the blade of the wafer-handling end effector, a second surface extension that defines a second wafer-facing extension side with a second wafer-facing extension surface area that differs from the first wafer-facing extension surface area.

C2. The method of paragraph C1, wherein at least one of:
  (i) the separating includes resiliently deforming the first surface extension; and
  (ii) the attaching includes resiliently deforming the second surface extension.

C3. The method of any of paragraphs C1-C2, wherein the attaching includes attaching via an attachment mechanism of the wafer-handling end effector.

C4. The method of any of paragraphs C1-C3, wherein the method includes performing the separating and the attaching while the blade is affixed to a wafer-handling robot.

C5. The method of any of paragraphs C1-C4, wherein, subsequent to the attaching, the method further includes lifting the wafer, and further wherein the method includes performing the lifting without first teaching the robot.

C6. The method of any of paragraphs C1-C5, wherein, prior to the separating, the method includes utilizing the end effector to position a first wafer of a first diameter, and further wherein, subsequent to the attaching, the method further includes utilizing the end effector to position a second wafer of a second diameter, which differs from the first diameter.

C7. The method of any of paragraphs C1-C6, wherein the wafer-handling end effector includes any suitable structure of any of the wafer-handling end effectors of any of paragraphs A1-A61.

INDUSTRIAL APPLICABILITY

The end effectors, probe systems, and methods disclosed herein are applicable to the semiconductor manufacturing and test industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A wafer-handling end effector configured to selectively lift a wafer from an upper surface of the wafer via a pressure force, the end effector comprising:
   a blade that defines a wafer-facing blade side, wherein the blade includes a gas distribution manifold in fluid communication with the wafer-facing blade side;
   a surface extension that defines a wafer-facing extension side that extends away from the blade, wherein the surface extension extends at least partially around the wafer-facing blade side, and further wherein the surface extension includes at least three projecting regions that project from the wafer-facing extension side, wherein the at least three projecting regions are configured to physically contact the upper surface of the wafer when the end effector selectively lifts the wafer; and
   an attachment mechanism configured to permit selective attachment of the surface extension to the blade and selective separation of the surface extension from the blade.

2. The end effector of claim 1, wherein the end effector includes a plurality of surface extensions, and further wherein each surface extension of the plurality of surface extensions is configured to be individually and selectively attached to the blade and individually and selectively separated from the blade via the attachment mechanism.

3. The end effector of claim 1, wherein the surface extension is a first surface extension, wherein the end effector includes a second surface extension, and further wherein the end effector is configured such that the attachment mechanism permits selective attachment and selective separation of only one of the first surface extension and the second surface extension to the blade at a given time.

4. The end effector of claim 1, wherein at least one of:
   (i) the first surface extension defines a first surface extension shape, and wherein the second surface extension defines a second surface extension shape that differs from the first surface extension shape; and
   (ii) the first surface extension includes at least three first projecting regions, the second surface extension includes at least three second projecting regions, and a relative orientation of the at least three first projecting regions differs from a relative orientation of the at least three second projecting regions.

5. The end effector of claim 1, wherein the blade includes an extension-receiving region, and further wherein the surface extension extends around the extension-receiving region.

6. The end effector of claim 5, wherein the extension-receiving region is at least one of:
   (i) an arcuate extension-receiving region;
   (ii) an at least partially circular extension-receiving region;
   (iii) an at least partially U-shaped extension-receiving region; and
   (iv) a polygonal-shaped extension-receiving region.

7. The end effector of claim 1, wherein the wafer-facing blade side is an at least substantially planar wafer-facing blade side.

8. The end effector of claim 1, wherein the blade defines a wafer-opposed blade side and a blade edge that extends between the wafer-facing blade side and the wafer-opposed blade side, wherein the wafer-opposed blade side is an at least substantially planar wafer-opposed blade side, and further wherein the blade edge defines an extension-receiving region of the blade.

9. The end effector of claim 1, wherein the blade is defined by a blade material, wherein the surface extension is defined by an extension material that differs from the blade material.

10. The end effector of claim 1, wherein the gas distribution manifold includes a plurality of apertures defined within the wafer-facing blade side.

11. The end effector of claim 10, wherein the wafer-facing blade side defines a wafer-facing blade side normal direction, wherein the plurality of apertures extends from a plurality of corresponding fluid conduits, wherein each fluid conduit of the plurality of corresponding fluid conduits defines a corresponding fluid flow axis, and further wherein the corresponding fluid flow axis of each fluid conduit is oriented at a corresponding flow angle relative to the wafer-facing blade side normal direction, and further wherein the corresponding flow angle is at least 30 degrees and at most 80 degrees.

12. The end effector of claim 11, wherein the plurality of apertures is arranged in a plurality of concentric circles, and further wherein the corresponding flow angle of each fluid conduit of each aperture within a given concentric circle of the plurality of concentric circles extends along an at least partially conic surface.

13. The end effector of claim 1, wherein the gas distribution manifold is configured such that the wafer-handling end effector selectively lifts the wafer via at least one of the Bernoulli effect and the cyclone effect.

14. The end effector of claim 1, wherein the wafer-facing extension side extends at least substantially parallel to the wafer-facing blade side.

15. The end effector of claim 1, wherein the at least three projecting regions are configured to physically contact the upper surface of the wafer within an edge exclusion zone of the wafer.

16. The end effector of claim 1, wherein, when the end effector selectively lifts the wafer, the at least three projecting regions are configured to resist sliding motion relative to the wafer via a static friction force between the wafer and a projection end of each of the at least three projecting regions.

17. The end effector of claim 1, wherein the attachment mechanism includes at least one of a clasp, a lever, a cam, a fastener, a keyed region, a projecting region, a recessed region, a friction fit, a resilient fit, an adhesive connection, a magnetic connection, a vacuum connection, and an electrostatic connection.

18. A method of utilizing the wafer-handling end effector of claim 1, wherein the surface extension is a first surface extension, and further wherein the wafer-facing extension side is a first wafer-facing extension side, the method comprising:
    separating, from the blade of the wafer-handling end effector, the first surface extension that defines the first wafer-facing extension side with a first wafer-facing extension surface area; and
    attaching, to the blade of the wafer-handling end effector, a second surface extension that defines a second wafer-facing extension side with a second wafer-facing extension surface area that differs from the first wafer-facing extension surface area.

19. The method of claim 18, wherein at least one of:
    (i) the separating includes resiliently deforming the first surface extension; and
    (ii) the attaching includes resiliently deforming the second surface extension.

20. The method of claim 19, wherein, prior to the separating, the method includes utilizing the end effector to position a first wafer of a first diameter, and further wherein, subsequent to the attaching, the method further includes utilizing the end effector to position a second wafer of a second diameter, which differs from the first diameter.

21. A probe system configured to test a wafer that includes an integrated circuit device, the probe system comprising:
    a chuck that defines a support surface configured to support the wafer;
    a signal generation and analysis assembly configured to generate a test signal and to receive a resultant signal;
    a probe assembly configured to at least one of:
    (i) receive the test signal from the signal generation and analysis assembly and provide the test signal to the integrated circuit device; and
    (ii) receive the resultant signal from the integrated circuit device and provide the resultant signal to the signal generation and analysis assembly;
    a wafer-handling robot configured to position the wafer within the probe system, wherein the wafer-handling robot includes the end effector of claim 1; and
    a pressurized gas source configured to selectively provide a pressurized gas stream to the gas distribution manifold to generate the pressure force that selectively lifts the wafer.

* * * * *